United States Patent [19]
Richardson et al.

[11] Patent Number: 5,205,785
[45] Date of Patent: Apr. 27, 1993

[54] CONTROL SYSTEM FOR THE VENTILATING MEANS IN A POULTRY BUILDING OR THE LIKE

[76] Inventors: R. H. Richardson, Rte. 31, Box 12A, Hayesville, N.C. 28904; Hank D. Beesley, 2991 Woodrow Way, Atlanta, Ga. 30319

[21] Appl. No.: 834,933

[22] Filed: Feb. 13, 1992

[51] Int. Cl.[5] .......................................... F24F 11/02
[52] U.S. Cl. ..................................... 454/256; 119/25; 454/239
[58] Field of Search ............... 454/196, 234, 256, 258; 49/31; 119/21

[56] References Cited

U.S. PATENT DOCUMENTS

| | | | |
|---|---|---|---|
| 3,973,173 | 8/1976 | Smith | 119/21 X |
| 4,428,278 | 1/1984 | Sutton, Jr. | 119/21 X |
| 4,484,084 | 11/1984 | Gheffer | 307/64 |
| 4,605,162 | 8/1986 | Crider | 236/49.5 |
| 4,894,744 | 1/1990 | Talbot | 361/91 |

*Primary Examiner*—Harold Joyce
*Attorney, Agent, or Firm*—Rodgers & Rodgers

[57] ABSTRACT

Normally closed ventilating elements of a poultry building or the like are opened in response to failure of the supply of electric power to the building ventilating system by a control system which includes a source of direct current electricity arranged so as normally to energize an electromagnet and thereby to secure its armature to the electromagnet. The armature is secured to the handle of a winch which is arranged to operate the building shades. Power to the electromagnetic device is controlled through a MOSFET acting as a switch and which is controlled by a parallel combination of a capacitor and a resistor which are connected in parallel with the MOSFET gate. When power is lost, the capacitor discharges through the resistor and deenergizes the electromagnet so as to free its armature to rotate with the winch handle to open the building curtains.

14 Claims, 1 Drawing Sheet

U.S. Patent
Apr. 27, 1993
5,205,785
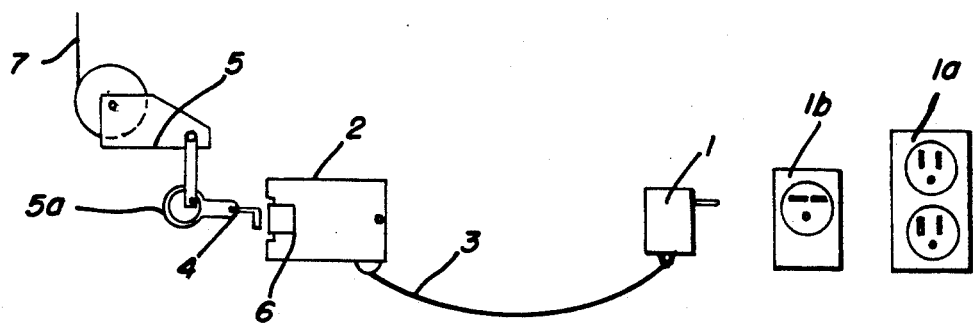
FIG. 1
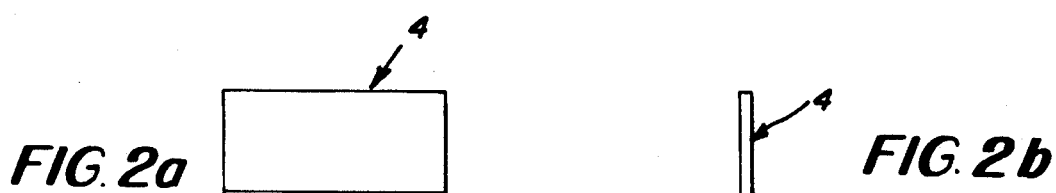
FIG. 2a   FIG. 2b
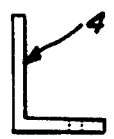
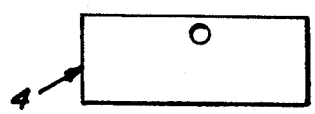
FIG. 2c
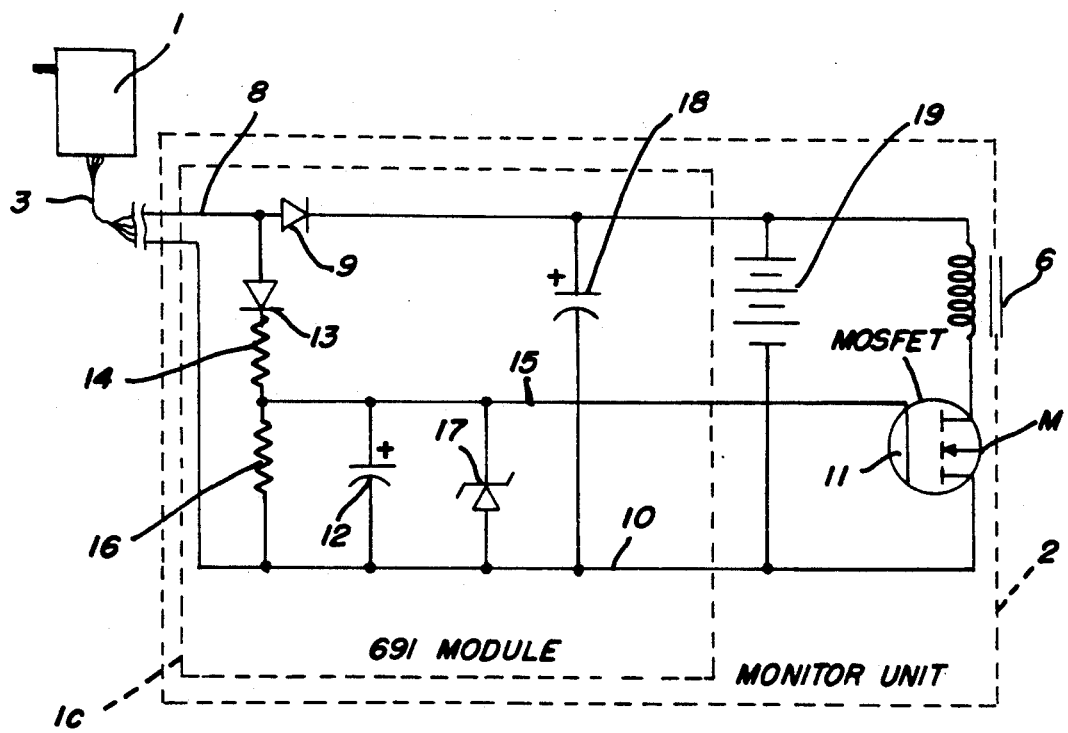
FIG. 3

CONTROL SYSTEM FOR THE VENTILATING MEANS IN A POULTRY BUILDING OR THE LIKE

TECHNICAL FIELD

This invention relates to a control system for opening normally closed ventilating means in a poultry building or the like in response to power failure of the building ventilating system.

BACKGROUND ART

U.S. Pat. No. 3,429,298 issued Feb. 25, 1969 discloses a poultry house and an associated curtain raiser which includes an electric motor controlled by a relay, a thermostat and a timer to operate the building curtains through a system of controlled cables.

U.S. Pat. No. 4,605,162 issued Aug. 12, 1986 discloses a bimetal strip mounted to a mechanical arm and inserted into a power resistor used as a heater. In arrangements of this type, the time delay following power failure cannot be determined with any degree of accuracy and the energy required is substantial.

SUMMARY OF THE INVENTION

According to this invention in one form the operating handle of a winch used to operate building curtains is arranged with its handle physically connected with the armature of an electromagnet. The electromagnet is energized from a source of direct electric current through circuit elements including a MOSFET operated as a switch. The gate of the MOSFET is arranged in parallel with a resistor and a capacitor so that upon the occurrence of power failure discharge of the capacitor through the resistor the drain to source resistance of the MOSFET is increased. At a predetermined point proportional to the product of the resistance of the resistor and the capacitance of the capacitor the MOSFET is switched off to deenergize the electromagnet and to release its armature which in turn allows the winch to rotate and to open the curtains.

BRIEF DESCRIPTION OF THE DRAWINGS

In the drawings, FIG. 1 is a schematic representation of the elements of the invention which control a winch and its associated cable arranged to operate building curtains not shown;

FIGS. 2a, 2b and 2c are enlarged separate views of an armature which is secured to the winch handle and is controlled by an electromagnetic device; and FIG. 3 is a system wiring diagram showing the details of the electric components provided according to this invention.

BEST MODE FOR CARRYING OUT THE INVENTION

In the drawings the numeral 1 designates a power module which is a commercially available power unit such as Technical Device P/N AD-0630 supplied by Technical Devices, Inc. having a place of business at 8529 North Dixie Drive, Dayton, Ohio 45414. These units require only two watts of power for proper operation. Power module 1 may be energized from a wall outlet either from a source 1a of 120 volts AC or from a source 1b of 240 volts AC. In either event the output is 6 volts direct current. As shown in FIGS. 1 and 3, monitor unit 2 is energized through conductors 3 from power module 1. Monitor unit 1c provides the control functions necessary and is identified as P/N 691 built by T&M Inc. located at P.O. Box 1, Young Harris, Ga. 30582. An armature 4 is interconnected with crank handle 5a of winch 5. The armature 4 is held in position immediately adjacent the electromagnet 6 when that magnet is energized. When current to the electromagnet 6 is interrupted, the armature 4 is released and the winch handle rotates thereby to relax the tension on the curtain control cable 7 and to allow the associated curtains to open as is well known. If desired, several electromagnets could be connected in parallel and their associated armatures would drop out at about the same time. Ordinarily only one electromagnet is required.

Under normal conditions with the ventilating means closed, the electromagnetic device 6 is energized by current from power module 1 through conductors 3 and 8, diode 9, the source to drain elements of MOSFET M, and conductor 10. Conduction through MOSFET M is controlled by gate 11.

During normal operation, the capacitor 12 is charged from conductor 8 through diode 13 resistor 14 and conductor 15. The capacitor 12 and resistor 16 are connected in parallel and upon occurrence of a power failure, capacitor 12 begins to discharge through resistor 16. Since the discharge rate of capacitor 16 is proportional to the product of the resistance of resistor 16 and the capacitance of capacitor 12, the time required for discharge down through the threshold of the MOSFET M is readily determined. When the capacitor 12 is discharged to threshold, the MOSFET drain to source resistance increases and reduces current through the electromagnet 6. At a predetermined point, the MOSFET switch is off and the current through the electromagnetic device 6 is reduced and the magnetic field is reduced. When the magnetic field strength is no longer sufficient to maintain the armature 4 in position of control by the electromagnetic device 6, the armature is released and then is free to rotate with the handle 5a of the winch 5. Tension on cable 7 is reduced and the curtains fall to open the building windows.

The zener diode 17 is inserted into the circuit for limiting spike voltage at the gate 11 of the MOSFET.

The capacitor 18 provides for filtering of the unregulated full wave rectified output from the power module 1.

The battery 19 maintains energization of the electromagnet 6 during the time delay period determined on the basis of the values of resistor 16 and capacitor 12.

From the above description, it is apparent that there are no cables to become entangled because there are no cables between the armature 4 and the electromagnetic device 6. Also the unit is ideally mounted on a horizontal level to the winch handle which is free to swing out of the path of the winch as it rotates. The components of the structure enclosed by the dotted line box 1c are sealed in epoxy and the electromagnetic coil is coated and sealed so that moisture, dust etc. have no effect on the operational characteristics of the unit.

The voltage across conductors 8 to 10 is 6 volts direct current and the current is 0.30 ampere so that the entire unit requires less than 2 watts of power.

The time delay period is provided so as to preclude operation of the unit in case a temporary loss of power occurs. This time delay is accurately determinable due to the fact that the discharge rate of capacitor 12 through resistor 16 is proportional to the product of the resistance of resistor 16 and the capacitance of capacitor 12. This fact enables the time delay to be predetermined precisely.

According to this invention a reliable, fail safe, low power, antifouling means for activating the mechanical emergency apparatus in the event of an electric power failure is provided.

Also the system requires very low maintenance and is easily reset and requires no replacement of expended parts after each power outage.

The arrangement can instantly reset upon reapplication of power even if such reapplication occurs during the delay time.

The device can be quickly and easily tested without the expense of expendable parts and of time consuming delays.

Also the operation of the unit is effected without any risk that cables could become entangled in the winch handle.

The operating characteristics are not altered by exposure to environmental conditions.

A state of the art channel enhancement mode MOSFET was chosen because of the extremely high gate input impedance ($10^{12}$ ohms) which allows a simple RC integrator network when charged to a voltage above threshold to maintain the gate voltage above threshold for a predetermined time which is dependent only upon the product of the resistance of resistor 16 and the capacitance of the capacitor 12.

We claim:

1. A control system for opening normally closed ventilating means in a poultry building or the like, said system comprising a power module for supplying direct electric current, at least one electromagnet arranged when energized to engage and hold an associated armature and to release said armature when deenergized, circuit means including the drain to source channel of a MOSFET for connecting said power module in series with said electromagnet, a capacitor connected in parallel with a resistor and with the gate of said MOSFET and arranged to increase the drain to source channel resistance of said MOSFET in coordination with the discharge of said capacitor through said resistor following a predetermined reduction in the voltage of said power module thereby to deenergize said electromagnet and release said armature.

2. A control system according to claim 1 wherein the rate of discharge of said capacitor is proportional to the product of the resistance of said resistor and the capacitance of said capacitor.

3. A control system according to claim 2 wherein resistance and capacitance quantities are chosen to produce a threshold condition of said MOSFET which occurs a predetermined delay time following said predetermined reduction in the voltage of said power module.

4. A control system according to claim 1 wherein a zener diode is connected in parallel with said gate for limiting spike voltage at said gate.

5. A control system according to claim 1 wherein a capacitor is connected in parallel with said electromagnet and said drain to source channel for filtering of the unregulated full wave rectified direct electric current.

6. A control system according to claim 1 wherein the power required to operate the system is approximately two watts.

7. A control system according to claim 3 wherein a battery is connected across said electromagnet and said drain to source channel to maintain current through said electromagnet during said delay time.

8. A control system according to claim 1 wherein said ventilating means is normally closed by means operated by a winch having a crank handle and wherein said armature is secured to and movable with the crank handle of said winch.

9. A control system according to claim 8 wherein said armature is spaced laterally from said winch.

10. A system for controlling normally closed ventilating means of a poultry building or the like, said system comprising a source of direct electric current, an electromagnet arranged when energized to engage and hold an armature and to release said armature when deenergized, circuit means including the channel of a MOSFET for connecting and disconnecting said source of direct electric current in series with said electromagnet, a conductor connected with said source of direct electric current and in series with a diode, a resistor and with the gate of said MOSFET for maintaining the voltage at said gate above a threshold value and in an ON state thereby to maintain energization of said electromagnet.

11. A system according to claim 10 wherein the voltage at the gate falls below a threshold value in response to failure of said source of direct electric current.

12. A system according to claim 11 wherein the gate of said MOSFET is held above threshold for a limited time following failure of said source of direct electric current due to a parallel arrangement of a capacitor and a resistor connected between ground and the gate of said MOSFET.

13. A system according to claim 12 wherein the gate of said MOSFET is held above threshold for a period of time which is proportional to the product of the resistance of said resistor and the capacitance of said capacitor.

14. A system according to claim 13 wherein the gate of the MOSFET falls below threshold after said period of time and the MOSFET cuts off the current to said electromagnet thereby to release its armature and to operate its associated winch so as to open said ventilating means.

* * * * *